United States Patent Office 2,935,457
Patented May 3, 1960

2,935,457

PRODUCTION OF HARD AND FLEXIBLE MICROCRYSTALLINE WAXES

Alan Collier, Sunbury-on-Thames, England, assignor to The British Petroleum Company Limited, London, England, a British joint-stock corporation No Drawing. Application August 6, 1957
Serial No. 676,505

Claims priority, application Great Britain August 16, 1956

11 Claims. (Cl. 208—25)

This invention relates to the production of hard and flexible waxes from single-stage solvent-recrystallized wax which has been prepared from so-called bright stock slack wax by single-stage recrystallization at a temperature within the range 20–60° F. Bright stock slack wax is obtained from the residues of the vacuum stage of crude petroleum distillation and is often called crude microcrystalline wax since it contains a large proportion of microcrystalline wax having good flexibility and good adhesive properties.

The principal object of the invention is to provide a process for producing a good quality flexible wax for laminating and coating purposes or for use as a modifier for increasing the flexibility of paraffin wax, and a hard wax suitable for wax polishes. Flexible wax for laminating and coating purposes should be non-tacky and firm to the touch, i.e. it should have a melting point above about 140° F. and a penetration at 77° F. of not more than about 50 mm./10 (Institute of Petroleum standard method of test 50/48).

According to the invention, a process for the production of flexible and hard waxes from a single-stage solvent-recrystallized bright stock slack wax feedstock, comprises dissolving the feedstock in a wax solvent in which urea is insoluble, adding solid urea to the solution and agitating the mixture at an elevated temperature to cause adduction of the straight chain hydrocarbons present in the feedstock, filtering off the adduct, recovering the non-adducted (flexible) wax from the filtrate by distilling off the wax solvent, heating the adduct in a fresh quantity of the same wax solvent so as to cause decomposition of the adduct whereupon solid urea separates and the adducted wax goes into solution in the wax solvent, filtering off the urea from the solution of adducted wax, recovering the adducted (hard) wax from the solution by distilling off the wax solvent, and adding the separated urea to a fresh batch of feedstock. The expression "insoluble" may be taken to mean less than one percent soluble at the reaction temperature.

The solid urea should preferably be added to the wax solution in the weight ratio of 0.25–5.0 parts of urea to one part of wax.

Since decomposition of wax/urea adducts does not occur sufficiently at temperatures below 230° F., the boiling point of the wax solvent employed should preferably not be less than this temperature in order to minimize losses. The following solvents have been found to be particularly suitable:

(a) Xylene (any of the normally avialable forms)
(b) Toluene
(c) A mixture of xylene (65%) and isohexyl alcohol (35%), and
(d) A mixture of xylene (70%) and isoamyl alcohol (30%)

At 212° F. none of these solvents was very effective in breaking down the adducts but at 230° F. (a) and (b) each gave 92% recovery of adducted wax and at 240° F. (c) gave 96–97% and (d) substantially 100%. The boiling point of toluene is 240° F. and it is therefore less satisfactory than the other solvents which have considerably higher boiling points.

In the case of solvents (a) and (c) it is necessary to "seed" the reaction by the addition of a trace of some previously prepared adduct; in the case of the other solvents this is not necessary though the rate of reaction is accelerated by seeding.

Three examples of the invention will now be described.

EXAMPLE 1

Single-stage solvent-recrystallized bright stock slack wax obtained from a Middle Eastern crude oil was dissolved in a mixture of isoamyl alcohol (30%) and commercial xylene (70%) in a 10:1 ml./gm. solvent/wax ratio. Solid urea in the weight ratio of 2 parts of urea to one part of wax was then added. The mixture was then stirred using a dispersator-type stirrer at a temperature of 160–170° F. and the reaction was carried out for various periods. The reaction mixture was then filtered through a stainless steel sinter, the adduct being washed with fresh solvent at the reaction temperature. The non-adducted wax was recovered from the filtrate by distilling off the solvent.

Decomposition of the adduct was effected by heating in a fresh quantity of the same solvent at a temperature of 240° F. whereupon the adducted wax went into solution in the solvent and solid urea separated. The urea was filtered off and used to treat a fresh batch of feedstock. The adducted wax was recovered by distilling off the solvent.

Table 1 shows the yields and properties of the product waxes.

*Table 1*

| Reaction time, hours | | 1 | 2½ | 4 | 6 |
|---|---|---|---|---|---|
| Yields | Adduct wax | 16.7 | 18.6 | 24.6 | 24.6 |
| | Non Adduct wax | 83.3 | 81.4 | 75.4 | 75.4 |
| Melting point, °F. | Adduct wax | 190.4 | 190.8 | 188.4 | ------ |
| | Non Adduct wax | 151.2 | 150.8 | 146.8 | ------ |
| Flexibility, cycles at 0° C. | Adduct wax | 1 | 1 | 1 | ------ |
| | Non Adduct wax | 800 | 1,000 | 1,000 | 1,000 |

The adduct wax recovered in each case represented substantially 100% of the wax adducted.

EXAMPLE 2

The same procedure was carried out as in Example 1, except that the solvent used was a mixture of isohexyl alcohol (35%) and commercial xylene (65%). In this case it was necessary to seed the reaction by the addition of a trace of some previously prepared adduct.

The yields and properties of the product waxes are given in Table 2.

*Table 2*

| Reaction time, hours | | 1 | 2½ | 4 |
|---|---|---|---|---|
| Yields | Adduct wax | 21.3 | 20.7 | 24.0 |
| | Non Adduct wax | 78.7 | 79.3 | 76.0 |
| Melting point, °F. | Adduct wax | 189.7 | 189.0 | 188.6 |
| | Non Adduct wax | 150.1 | 147.3 | 148.3 |
| Flexibility, cycles at 0° C. | Adduct wax | <1 | <1 | <1 |
| | Non Adduct wax | 800 | 800 | 850 |

The adduct wax recovered in each case represented approximately 96–97% of the wax adducted.

EXAMPLE 3

Single-stage solvent-recrystallized bright stock slack wax obtained from a Middle Eastern crude oil was dissolved in pure commercial xylene in a 5:1 ml./gm. solvent/wax ratio. Solid urea in the weight ratio of 3 parts of urea to one part of wax was then added. The mixture was seeded by the addition of a trace of some previously prepared adduct and stirred using a dispersator-type stirrer at a temperature of 125–130° F. (i.e. about 5° F. above the solubility temperature) and the reaction was carried out for various periods. The reaction mixture was then filtered through a stainless steel sinter, the adduct being washed with fresh xylene at the reaction temperature. The non-adducted wax was recovered from the filtrate by distilling off the solvent.

Decomposition of the adduct was effected by heating in fresh xylene at a temperature of 230° F., whereupon the adducted wax went into solution in the solvent and solid urea separated. The urea was filtered off and used to treat a fresh batch of feedstock. The adducted wax was recovered by distilling off the solvent.

Table 3 shows the yields and properties of the product waxes.

Table 3

| Reaction time, hours | | 1 | 2½ | 4 |
|---|---|---|---|---|
| Yields | Adduct wax | 11.7 | 14.0 | 26.8 |
| | Non Adduct wax | 88.3 | 86.0 | 73.2 |
| Melting point, ° F | Adduct wax | 193 | 193 | 187 |
| | Non Adduct wax | 158 | 157 | 147 |
| Flexibility, cycles, 0° C | Adduct wax | 1 | 1 | 1 |
| | Non Adduct wax | 320 | 590 | 1,000 |

The adduct wax recovered in each case represented approximately 92% of the wax adducted.

An advantage of this technique is that the same solvent can be used throughout the process and, on decomposition of the adduct with that solvent, the adducted wax goes into solution in the solvent leaving separated urea available for the next charge. The problem of urea recovery from aqueous solutions on a large scale is thus eliminated.

The flexibility test is carried out on a machine designed to rupture a wax strip by continuous flexing through a constant angle, the flexibility being given by the number of cycles required to rupture the strip.

I claim:

1. A process for the production of flexible and hard waxes from a single-stage solvent-recrystallized bright stock slack wax feedstock, comprising forming a water-free solution of the feedstock in a wax solvent in which urea is insoluble, adding solid urea to the water-free solution and agitating the water-free mixture at an elevated temperature to cause adduction of the straight chain hydrocarbons present in the feedstock, filtering off the adduct, recovering the non-adducted (flexible) wax from the filtrate by distilling off the wax solvent, heating the adduct in a fresh quantity of the same wax solvent so as to cause decomposition of the adduct whereupon solid urea separates and the adducted wax goes into solution in the wax solvent, filtering off the urea from the solution of adducted wax, recovering the adducted (hard) wax from the solution by distilling off the wax solvent, and adding separated urea to a fresh batch of feedstock.

2. A process according to claim 1, in which the boiling point of the wax solvent is not less than 230° F.

3. A process according to claim 2, in which the wax solvent is xylene.

4. A process according to claim 2, in which the wax solvent is a mixture of xylene and isohexyl alcohol.

5. A process according to claim 2, in which the wax solvent is a mixture of xylene and isoamyl alcohol.

6. A process according to claim 1, in which the solid urea is added to the wax solution in the weight ratio of 0.25–5.0 parts of urea to one part of wax.

7. A process according to claim 1, in which the agitation is carried out for a period of from 1–6 hours.

8. A process according to claim 1, in which the agitation is effected by stirring using a dispersator type stirrer.

9. A process according to claim 1, in which the said elevated temperature lies in the range 125–170° F.

10. A process according to claim 1, in which the decomposition of the adduct is carried out at a temperature in the range 230–240° F.

11. A process according to claim 1, in which the wax feedstock is dissolved in the wax solvent in the ratio of from 5–10 ml. solvent to one gm. wax.

References Cited in the file of this patent

UNITED STATES PATENTS

| 2,546,328 | Arabian et al. | Mar. 27, 1951 |
| 2,596,344 | Newey et al. | May 13, 1952 |
| 2,663,671 | Wiles et al. | Dec. 22, 1953 |
| 2,673,195 | Busso et al. | Mar. 23, 1954 |
| 2,823,172 | Rumberger et al. | Feb. 11, 1958 |